United States Patent [19]
Kasai et al.

[11] Patent Number: 5,814,687
[45] Date of Patent: Sep. 29, 1998

[54] MAGNETIC POLYMER PARTICLE AND PROCESS FOR MANUFACTURING THE SAME

[75] Inventors: Kiyoshi Kasai, Kameyama; Masayuki Hattori, Aichi; Kakun Han, Tsukuba, all of Japan

[73] Assignee: JSR Corporation, Tokyo, Japan

[21] Appl. No.: 791,745

[22] Filed: Jan. 30, 1997

[30] Foreign Application Priority Data

Jan. 31, 1996  [JP]  Japan .................................. 8-015376

[51] Int. Cl.$^6$ ...................................................... C08K 7/16
[52] U.S. Cl. ............................................ 523/223; 523/122
[58] Field of Search ..................................... 523/122, 223

[56] References Cited

U.S. PATENT DOCUMENTS

| | | | |
|---|---|---|---|
| 4,654,267 | 3/1987 | Ugelstad et al. | 428/407 |
| 5,510,169 | 4/1996 | Greczyna et al. | 428/147 |

OTHER PUBLICATIONS

Japanese Abstract, JP05138009A, Jun. 1, 1993.
Japanese Abstract, JP59221302, Dec. 12,1984.

*Primary Examiner*—Kriellion S. Morgan
*Attorney, Agent, or Firm*—Oblon, Spivak, McClelland, Maier & Neustadt, P.C.

[57] ABSTRACT

Novel magnetic polymer particles which resists precipitation in an aqueous medium. The novel magnetic polymer particles can be widely used as carriers for diagnostics and immobilized enzymes, carriers for bacterial isolation, carriers for cell segregation, carriers for isolation and purification of ribonucleic acids and proteins, carriers for drug deliveries, and are usable as material for magnetic toners, magnetic inks, and magnetic coatings. The process for manufacturing the magnetic polymer particles comprising; dispersing a monomer mixture including a hydrophobic monomer containing more than 50% by weight of (meth) acrylic ester and a superparamagnetic substance in an aqueous medium to prepare an suspension, and polymerizing the monomers.

10 Claims, No Drawings

MAGNETIC POLYMER PARTICLE AND PROCESS FOR MANUFACTURING THE SAME

BACKGROUND OF THE INVENTION

1. Field of the Invention

The present invention relates to magnetic polymer particles and a process for manufacturing the magnetic polymer particles. The magnetic polymer particles of the present invention are suitable as carriers for diagnostics and immobilized enzymes, carriers for bacterial isolation, carriers for cell segregation, carriers for isolation and purification of ribonucleic acids and proteins, carriers for immobilized enzymes, carriers for drug deliveries, and usable as a material for magnetic toners, magnetic inks, and magnetic coatings.

2. Description of the Background Art

Magnetic polymer latexes are expected to exhibit excellent handling characteristics required for carriers for diagnostics and carriers for isolation and purification of cells, proteins, or ribonucleic acids, because they are capable of easily isolating and collecting latex particles by utilizing magnetic intensity.

Also, magnetic polymer latexes capable of forming a film by drying or heating are expected to find use as material for magnetic toners, magnetic inks, and magnetic coatings.

The following processes (1)–(3) are known as methods for synthesizing magnetic polymer particles constituting the magnetic polymer latex.

(1) A process comprising dispersing a magnetized and lipophilicated magnetic substance in a polymerizable monomer and subjecting the polymerizable monomer to suspension polymerization to prepare magnetic polymer particles (see Japanese Patent Application Leid-open No. 221302/1984).

(2) A process comprising dispersing a lipophilicated magnetic substance in an organic phase including a vinyl aromatic monomer, and homogeneously mixing the organic phase with a water phase using a homogenizer followed by polymerization to prepare magnetic polymer particles with a comparatively small particle size (see U.S. Pat. No. 4,358,388).

(3) A process comprising precipitating an iron compound in the presence of porous polymer particles having a specific functional group, and introducing a magnetic substance into the porous polymer particles by oxidizing the iron compound to prepare magnetic polymer particles with a uniform and large particle size of over 2 $\mu$m (see U.S. Pat. No. 4,654,267 and U.S. Pat. No. 4,774,265).

However, because the magnetic substance having coercive force without superparamagnetic force is magnetized in the above process (1), the dispersed particles are agglomerated and flocculated when polymerized. The resulting magnetic polymer particles therefore have a large particle size of 3–25 $\mu$m. Such magnetic polymer particles tend to precipitate in an aqueous medium. Also, the resulting polymer particles are incapable of adsorbing enough object material because of their small surface area when they are used as an adsorbent for the object material. In addition, because polymers of styrene have inferior affinity with a magnetic substance which is an inorganic substance, the magnetic substance may be separated or flocculated in the polymer particles, or deposited near the surface of the polymer particles, even if the magnetic substance is sufficiently dispersed in monomers before polymerization. Furthermore, because styrene-type monomers have the aromatic structure which is involved in absorption of ultraviolet lights and emission of fluorescent lights, magnetic polymer particles containing a large amount of styrene monomers mat have a problem when physiologically active compounds are detected or identified. The strong absorbency, particularly strong non-specific absorbency of the styrene polymer particles with proteins may also cause a problem when the magnetic polymer particles containing styrene monomers are used for diagnostics.

For the magnetic polymer particles obtained in the above process (2), the homogeneous dispersibility of the magnetic substance in the particles is insufficient and the magnetic substance is locally adsorbed on the surface of the particles. Iron ions are therefore eluted from the magnetic polymer particles and the magnetic substance is dissolved so that the characteristics required of the magnetic polymer particles are damaged.

In the above process (3), the step of producing the magnetic polymer particles is complicated. There is also a problem that the iron ions are eluted since the magnetic substance is not capsulized by a polymer.

There is disclosed a process for ferrimagnetizing the surface of polymer particles by precipitating an iron compound in an emulsion of polymer particles (see U.S. Pat. No. 5,320,944 and Japanese Patent Application Laid-open No. 138009/1993). However, there is a problem in this process inasmuch as iron ions are markedly eluted from the magnetic polymer particles, since the magnetic substance exists on the surface of the particles.

When the magnetic polymer particles prepared by the above conventional processes are used, for example, as a carrier for diagnostics, there are cases where a sufficiently high sensitivity cannot be obtained and an unspecific enzymatic reaction is generated so that the actual performance of the magnetic polymer particles is unsatisfactory. It is thought that this results from the fact that the iron ions are eluted outward, having an adverse influence on the actual performance of the magnetic polymer particles because the magnetic substance is locally exposed on the surfaces of the magnetic polymer particles or micro passes are formed between the surface of the particles and the magnetic substance existing within the particles.

There is disclosed art (see U.S. Pat. No. 5,356,713) wherein magnetic polymer particles including a magnetic substance can be prepared by polymerizing a hydrophobic cross-linking monomer in an aqueous phase using magnetic particles as a core to control considerably the outward elution of the iron ions. However, the elution of the iron ions cannot be restrained by this method. Also, there is disclosed art (see Japanese Patent Publication No. 16164/1993) wherein a coating film from a polymer excluding a magnetic substance is formed on the surface of magnetic polymer particles. In the embodiments of this disclosed art, only an interfacial polycondensation method and a spray drying method are disclosed. However, these methods can be only applicable in limited industrial fields. Japanese Patent Application Laid-open No. 57921/1993 discloses synthesis of magnetic particles by emulsion polymerization. However, it is difficult to produce large particles by emulsion polymerization and to obtain magnetic particles exhibiting superior magnetic sedimentation characteristics with excellent reproducibility.

Because the magnetic polymer particles manufactured using conventional processes have the problem of elution of iron ions, they are applicable under the present situation only in fields where the elution of iron ions has no influence. It is desired that magnetic polymer particles capable of exhibiting excellent dispersibility of a magnetic substance and restraining the outward elution of iron ions be developed.

Also, in view of actual use, the magnetic polymer particles are required to resist precipitation and to maintain a uniform dispersed state in an aqueous medium.

The present invention has been achieved in view of this situation and has an object of providing novel magnetic polymer particles capable of exhibiting an excellent, homogeneous dispersibility of a superparamagnetic substance. Another object of the present invention is to provide magnetic polymer particles, which are widely applicable in many fields, without the elution of iron ions. A further object of the present invention is to provide magnetic polymer particles which resist precipitation in an aqueous medium. A still further object of the present invention is to provide a process for manufacturing the magnetic polymer particles having the above excellent characteristics.

SUMMARY OF THE INVENTION

The above objects can be attained in the present invention by the provision of magnetic polymer particles with a particle diameter of 0.5–30 μm, which comprises:

100 parts by weight of a copolymer which is comprised of (A) 30–99% by weight of alkyl (meth)acrylate monomer unit having an alkyl group containing 4–20 carbon atoms, (B) 1–20% by weight of a monomer unit containing unsaturated carboxylic acid, and (C) 0–69% by weight of vinyl monomer unit which is copolymerizable with the monomers (A) and (B), and 3–100 parts by weight of a superparamagnetic substance.

In a preferred embodiment, the above alkyl (meth)acrylate monomer unit (A) having an alkyl group containing 4–20 carbon atoms is selected from the group consisting of 2-ethylcyclohexyl acrylate, 2-ethylcyclohexyl methacrylate, cyclohexyl acrylate, and cyclohexyl methacrylate; and the vinyl monomer unit (C) which is copolymerizable with the monomer units (A) and (B) is selected from the groups consisting of alkyl (meth)acrylates having an alkyl group containing 1–3 carbon atoms and polyfunctional vinyl compounds.

In another preferred embodiment, said copolymer is comprised of (A) 50–85% by weight of cyclohexyl methacrylate, (B) 1–10% by weight of a monomer containing unsaturated carboxylic acid, and (C) 0–45% by weight of an alkyl (meth)acrylate having an alkyl group containing 1–3 carbon atoms.

In still another preferred embodiment, said copolymer is comprised of (A) 30–50% by weight of 2-ethylcyclohexyl methacrylate, (B) 1–10% by weight of a monomer containing unsaturated carboxylic acid, and (C) 20–40% by weight of an alkyl (meth)acrylate having an alkyl group containing 1–3 carbon atoms and a polyfunctional vinyl compound.

The above objects can be further attained in the present invention by the provision of a process for manufacturing magnetic polymer particles comprising;

providing a monomer mixture which comprises a hydrophobic monomer containing more than 30% by weight of (meth)acrylic ester and a superparamagnetic substance, dispersing the monomer mixture in an aqueous medium to prepare a suspension, and polymerizing the monomers.

In preferred embodiments of the magnetic polymer particles and the process of the present invention, the hydrophobic monomer may contain 50–100% by weight of (meth)acrylic ester, 1–20% by weight of ethylenically unsaturated carboxylic acid, and 0–49% by weight of a monomer other than the monomers; the magnetic polymer particles may be prepared by the polymerization after adding a hydrophilic monomer to the suspension; the superparamagnetic substance may be an iron compound; the superparamagnetic substance may be lipophilicated; a polymer film excluding a magnetic substance may be formed on the magnetic polymer particles; after the polymerization, the magnetic polymer particles may be further treated with an iron solubilizer; the iron solubilizer may be at least one of compounds selected from among inorganic acids, organic acids, and complex forming agents; after the polymerization, the magnetic polymer particles may be further treated with an organic base or a water soluble solvent; the organic base may be an organic amine; the water soluble solvent may have a solubility of 1% by weight in water at 25° C.; and after the polymerization is substantially finished, a radically polymerizable monomer may be further added and polymerized.

The above objects of the present invention can be further attained by the provision of magnetic polymer particles manufactured by chemically or physically combining biologically activated material with the magnetic polymer particles prepared by the process.

Other objects, features and advantages of the invention will hereinafter become more readily apparent from the following description.

DETAILED DESCRIPTION OF THE INVENTION AND PREFERRED EMBODIMENTS

The present invention will now be explained in detail.

The magnetic polymer particles of the present invention are polymer particles with a particle diameter of 0.5–30 μm, comprising 100 parts by weight of a copolymer which is comprised of (A) 30–99% by weight of alkyl (meth)acrylate having an alkyl group containing 4–20 carbon atoms, (B) 1–20% by weight of a monomer containing unsaturated carboxylic acid, and (C) 0–69% by weight of vinyl monomer which is copolymerizable with the monomers (A) and (B), and 3–100 parts by weight of a superparamagnetic substance.

The term "monomer unit" in the present invention is defined to be a chemical structure of a monomer after the monomer has been radically polymerized.

In the magnetic polymer particles of the present invention, the monomer unit (A) is used in an the amount of 30–99% by weight, preferably 50–99% by weight, of the total amount of the copolymer.

Given as examples of the alkyl (meth)acrylates used in the present invention as the monomer unit (A) are the alkyl (meth)acrylates having 4 to 20, preferably 4–18, and more preferably 6 to 18 carbon atoms, such as butyl methacrylate, 2-ethylhexyl methacrylate, lauryl methacrylate, tridecyl methacrylate, atearyl methacrylate, cyclohexylethylene glycol methacrylate, cyclohexyldipropylene glycol methacrylate, cyclohexene dimethacrylate, methyl substituted cyclohexyl methacrylate, and benzyl methacrylate; and commercially available fluorinated (meth)acrylic esters such as Viscoat 8F, Viscoat 17F (manufactured by Osaka Organic Chemical Industry, Ltd.), and the like which have a solubility of less than 1% by weight in water at 20° C.

Among these (meth)acrylates, cyclohexyl acrylate, cyclohexyl methacrylate, 2-ethylhexyl acrylate, and 2-ethylhexyl methacrylate are preferred.

In the present invention, part of hydrogen atoms on the cyclohexyl ring may be replaced by C1–C5 alkyl groups.

The monomer unit containing unsaturated carboxylic acid (B) used in the present invention is a polymerizable monomer containing a radically polymerizable unsaturated bonds and a carboxyl group in the molecule. Specific examples of such a monomer unit containing unsaturated carboxylic acid include monocarboxylic acids such as acrylic acid, methacrylic acid, and crotonic acid; dicarboxylic acids such as itaconic acid, maleic acid, maleic acid anhydride, and their anhydrides.

This monomer unit (B) is used in the amount of 1–20% by weight, preferably 1–10% by weight, for the total amount of the monomers. If the amount of the monomer unit (B) is less than 1% by weight, the surface of the polymer particles is highly hydrophobic so that physical bonding of the particles with proteins is weak. In addition, because the chemical bonding characteristics are also insufficient, the polymer particles can combine only insufficiently with physiologically active substances such as proteins, enzymes, and nucleotides. If the amount of the monomer unit (B) is more than 20% by weight, on the other hand, the polymer particles is highly hydrophilic so that the state of bonding with proteins is poor.

Given as examples of the vinyl monomer unit (C) which is copolymerizable with the monomers (A) and (B) used in the present invention are aromatic vinyl compounds such as styrene and α-styrene; alkyl (meth)acrylate with C1–C3 alkyl groups, such as methyl (meth)acrylate and ethyl (meth) acrylate; cyanated vinyl compounds such as acrylonitrile; (meth)acrylate-type polyfunctional vinyl compounds such as ethylene glycol (meth)acrylate, diethylene glycol di(meth)acrylate, polyethylene glycol di(meth)acrylate, tetraethylene glycol di(meth)acrylate, diallylphthalate, and trimethylolpropane tri(meth)acrylate; and polyfunctional vinyl compounds containing two or more vinyl groups in the molecule such as divinylbenzene.

Particularly preferred vinyl monomer units (C) in the present invention are alkyl (meth)acrylates with C1–C3 alkyl groups.

When the monomer unit (A) is comprised only of 2-ethylhexyl (meth)acrylate, the vinyl monomer unit (C) is preferably a polyfunctional vinyl compound. In this instance, the polyfunctional vinyl compound is contained in the amount of 0.5–30% by weight, preferably 1–20% by weight, in the total amount of monomers. If less than 0.5% by weight, the resulting polymer particles are soft and may fuse or be deformed causing problems in actual use; if more than 30% by weight, the polymer particles are porous and fragile, also causing during actual use.

The amount of the aromatic vinyl compound monomer unit used in the total amount of the monomer units in the present invention is less than 50% by weight, preferably less than 20% by weight, and particularly preferably 0% by weight.

The molecular weight, reduced to polystyrene, of the copolymer used for the magnetic polymer particles in the present invention, is in the range of 10,000–1,000,000, and preferably 20,000–1,000,000.

Given as examples of the superparamagnetic substance contained in the magnetic polymer particles are metals such as triiron tetroxide ($Fe_3O_4$), γ-iron sesquioxide (γ-$Fe_2O_3$), ferrites, iron, manganese, cobalt, and alloys of cobalt, nickel, manganese, and the like. Among these, triiron tetroxide and ferrites are especially preferable.

The particle diameter of the superparamagnetic substance constituting the magnetic polymer particles is preferably 40–300 Å and more preferably 50–200 Å. A particularly preferable particle diameter of the superparamagnetic substance is 60–150 Å. If the particle diameter of the superparamagnetic substance is less than 40 Å, there are cases where the magnetic responsibility is reduced because a large quantity of treating agents such as a fatty acid, silane coupling agent, and titanium coupling agent is required for lipophilicating the superparamagnetic substance, resulting in reduction of the proportion of the superparamagnetic substance. If the particle diameter of the superparamagnetic substance exceeds 300 Å, the resulting magnetic polymer particles tend to precipitate in an aqueous medium because they are magnetized and coagulated. In this instance, the particle diameter of a spherical superparamagnetic substance is determined by calculating the average value of the maximum diameter and minimum diameter of the superparamagnetic substance.

The superparamagnetic substance used in the present invention may be lipophilicated. If a superparamagnetic substance which is not lipophilicated is used to produce the magnetic polymer particles, the superparamagnetic substance is locally adsorbed around and exposed on the surface of the magnetic polymer particles, which causes iron ions to be eluted in a water medium.

There is no specific limitation to the process for lipophilicating the superparamagnetic substance. Such processes include, for example, a method of treating with a surface treating agent such as silane coupling agent, titanium coupling agent or the like, and a method of adsorbing a fatty acid salt on the superparamagnetic substance. Also, a superparamagnetic substance obtained by removing a dispersant from a commercially available magnetic fluid product may be used.

2–300 parts by weight of the superparamagnetic substance is dispersed in 100 parts by weight of the copolymer.

It is preferable that the superparamagnetic substance be homogeneously dispersed in the copolymer. Particularly preferably, there should be almost no superparamagnetic substance present close to the surface of the magnetic polymer particles. Specifically, this requires that when 1 g amount of the magnetic polymer particles are immersed in 10 ml of pure water at 70° C. for two hours, the amount of metals dissolved in the solvent must be 10 ppm or less.

The number average particle diameter of the magnetic polymer particles of the present invention is 0.5–30 μm, and preferably 0.5–5 μm.

Now, the process for manufacturing the magnetic polymer particles of the present invention is described in detail.

The same alkyl (meth)acrylates having 4 to 20 carbon atoms as mentioned above are given as examples of the alkyl (meth)acrylates constituting the hydrophobic monomer.

In the present invention, in addition to the above (meth) acrylic esters, ethylenically unsaturated carboxylic acids and other vinyl monomers (hereinafter called "vinyl monomer") capable of copolymerizing with a (meth)acrylic ester and an ethylenically unsaturated carboxylic acid can be used as the hydrophobic monomer. Also, hydrophilic monomers may be jointly used. However, the hydrophobic property, that is the solubility in water (20° C.) of the mixture of these monomers must be less than 1% by weight.

The same monocarboxylic acids mentioned in connection with the monomer unit (B) are given as examples of the ethylenically unsaturated carboxylic acids used in the process of the present invention. These monocarboxylic acids can be used either individually or in combinations of two or more.

Given as examples of the vinyl monomer are compounds with a conjugated double bond such as butadiene and isoprene; α-olefin compounds such as 4-methyl-1-pentene; amides such as N-methylolacrylamide, acrylamide, methacrylamide, and methylenebisamide; vinyl cyanides such as acrylonitrile and methacrylonitrile; sulfonates such as stylene sulfonate and isoprene sulfonate; aromatic monomers such as stylene and divinylbenzene; vinyl carboxylates such as vinyl acetate, vinylmonochloro acetate, vinyl methacrylate, crotonic acid vinyl acetate, vinyl pivalate, vinyl-2-ethyl hexanoate, vinyl laurate, and vinyl stearate; and (meth)acrylates having a solubility in water (20° C.) of less than 0.1% by weight, such as methyl methacrylate, ethyl methacrylate, N,N'-dimethylaminoethyl methacrylate, glycidyl methacrylate, 2-methoxyethyl methacrylate, butoxyethyl methacrylate, carbitol acrylate, methyltriglycol acrylate, tetrahydrofurfuryl methacrylate, cyanoethyl methacrylate, 2-2-hydroxyethylacryloyl phosphate, 2-hydroxyethyl methacrylate, 2-hydroxypropyl methacrylate, ethylene glycol dimethacrylate, diethylene glycol dimethacrylate, triethylene glycol dimethacrylate, tetraethylene glycol dimethacrylate, and diallyl phthalate.

It is desirable that the hydrophobic monomer include 30–100% by weight, preferably 50–100% by weight, more preferably 60–99% by weight, of the above acrylate; 0–20% by weight, preferably 1–20% by weight, of the above ethylenically unsaturated carboxylic acid; and 0–50% by weight, preferably 0–30% by weight, of the above vinyl monomer.

If the proportion of the methacrylate is less than 50% by weight, the superparamagnetic substance cannot be uniformly dispersed in the resulting magnetic polymer particles, and the superparamagnetic substance is locally adsorbed on the surface of the particles. As a result, the metal ion forming superparamagnet tends to elute.

The same superparamagnetic substance as mentioned above can be used in the process for the manufacturing the magnetic polymer particles. The superparamagnetic substance is preferably made lipophilic.

The proportion of the superparamagnetic substance in the magnetic polymer particles is preferably 1–100 parts by weight, and more preferably 5–80 parts by weight for 100 parts by weight of the acrylic polymer. A particularly preferred proportion of the superparamagnetic substance is 10–60 parts by weight. If the proportion of the superparamagnetic substance is less than 1 part by weight, the magnetic polymer particles exhibit only insufficient magnetic responsibility. On the other hand, if the proportion of the superparamagnetic substance exceeds 100 parts by weight, the superparamagnetic substance is exposed on the surface of the magnetic polymer particles, which causes metal ions to be eluted. Also, the magnetic polymer particles become fragile and do not possess practical strength.

The superparamagnetic substance used in the process of the present invention must be lipophilicated. If a superparamagnetic substance which is not lipophilicated is used to produce the magnetic polymer particles, the superparamagnetic substance is locally adsorbed around and exposed on the surface of the magnetic polymer particles, which causes iron ions to be eluted in a water medium.

There is no specific limitation to the process for lipophilicating the super paramagnetic substance. Such processes include, for example, a method of treating with a surface treating agent such as silane coupling agent, titanium coupling agent or the like, and a method of adsorbing a fatty acid salt on the superparamagnetic substance. Also, a superparamagnetic substance obtained by removing a dispersant from a commercially available magnetic fluid product may be used.

2–300 parts by weight of the superparamagnetic substance is dispersed in 100 parts by weight of the hydrophobic monomer.

If a hydrophilic monomer is used as a dispersant for the superparamagnetic substance, the superparamagnetic substance cannot be uniformly dispersed in the hydrophilic monomer and large crude particles are formed by the coagulation of the superparamagnetic substance precipitate in the monomer compound. Such a monomer compound cannot be emulsified and dispersed in a water phase.

As the equipment for dispersing the monomer compound (organic phase) in a water phase, a conventionally known ultrasonic dispersing machine, high pressure homogenizer, and dispersing machine with a high shear rate may be used.

There is no specific limitation to the type of ultrasonic machine. For example, a dispersing machine equipped with a horn type vibrator, dispersing machine equipped with a plate type vibrator, or continuous dispersing machine in which a liquid is introduced into a vibrator may be used as the ultrasonic machine. As the dispersing machine with a high shear rate, for example, a homomixer, colloid mill, jet homogenizer, high pressure homogenizer may be used. These dispersing machines may be optionally selected according to the intended particle diameter.

An emulsifying method using a membrane can be used. In this method, the monomer compound (organic phase) is emulsified and dispersed in a water phase by extruding the monomer compound into the water phase through a porous membrane or porous filter.

Water is used preferably as the aqueous medium in the present invention.

Surfactants or emulsifiers such as an anionic surfactant, non-ionic surfactant, water-soluble high polymer, and inorganic suspension protective agent may be added to the water phase which is a medium for dispersing the monomer compound. Among these surfactants or emulsifiers, partially saponificated polyvinyl alcohol is preferably used in view of producing particles with a large diameter distribution and synthesizing particles having either a plus or minus surface charge. This ensures the magnetic substance to be homogeneously dispersed by the use of a polymer from hydrophobic monomers, and at the same time, the polymers close to the surface of particles to be composed of a polymer with comparatively high hydrophilic characteristics. Stability of the particles and the affinity with physiological substances are thereby increased. The hydrophilic monomers added in the later stage should have a solubility of 0.1 wt % or more in water at 20° C. These monomers can be selected from the previously mentioned monomers. The amount of the hydrophilic monomers used here is less 5 times or less, preferably 2 times or less, the amount of the hydrophobic monomers. If too much hydrophilic monomers are added, stability of the resulting dispersion monomers are impaired and a large amount of fine particles with no magnetic substance contained therein are produced.

A hydrophilic monomer can be added as required to the suspension thus prepared.

Given as examples of the hydrophilic monomer are above-mentioned hydrophilic methacrylates and hydrophilic vinyl monomers such as methyl methacrylate, vinyl acetate, methacrylic acid, and itaconic acid.

In the present invention, it is desirable to use a hydrophobic monomer and a hydrophilic monomer as the methacrylate. The proportion of the hydrophobic monomer is 20–95% by weight, preferably 20–90% by weight and the proportion of the hydrophilic monomer is 80–5% by weight, preferably 80–10% by weight.

In the process for manufacturing the magnetic polymer particles of the present invention, there is no specific limitation to the polymerization initiator for polymerizing the monomers. Any radical polymerization initiator which is conventionally known can be used. Given as preferred examples of such radical polymerization initiators are organic peroxides, azo type initiators, and persulfate type initiators. Among these, oil soluble polymerization initiators are preferably used. It is preferable to add such an oil soluble polymerization initiator especially when dispersing the superparamagnetic substance in the hydrophobic monomer to prepare the monomer compound. By this method, the generation of polymer particles excluding the superparamagnetic substance can be avoided.

It is desirable that the polymerization reaction be carried out under an oxygen free condition. The reaction temperature depends on the decomposition temperature of the polymerization initiator. When using, for example, benzoil peroxide as the polymerization initiator, the reaction is excellently carried out at a temperature of 75°–85° C.

The number average particle diameter of the magnetic polymer particles is generally 0.02–10 µm, preferably 0.05–5 µm, and more preferably 0.1–2 µm. If the number average particle diameter is less than 0.02 µm, only insufficient magnetic responsibility can be exhibited. On the other hand, if the number average particle diameter exceeds 10 µm, not only the magnetic polymer particles tend to precipitate, but also the surface area of the magnetic polymer particles becomes small so that only insufficient amount of specific materials can be adsorbed when the magnetic polymer particles are used to adsorb the specific materials.

It is desirable in view of the handling characteristics that the magnetic polymer particles of the present invention resist precipitation in an aqueous medium and be kept in a uniformly dispersed state (hereinafter these characteristics may be called "stationary stability").

Specifically, the magnetic polymer particles are dispersed in an aqueous medium to prepare a magnetic polymer latex with a solid concentration of 1% by weight. The polymer latex is placed in a vessel to a liquid level of 2 cm. The vessel is shaken until the magnetic polymer particles are uniformly dispersed. When the vessel is allowed to stand for 10 minutes, the solid concentration of the resulting liquid phase from the liquid surface to 1 cm below the liquid surface is preferably more than 0.1% by weight and more preferably more than 0.3% by weight. A particularly preferable concentration of the liquid phase is more than 0.6% by weight.

It is desirable that a polymer layer (hereinafter called "surface coating layer") excluding the superparamagnetic substance be formed on the magnetic polymer particles of the present invention. This structure ensures the superparamagnetic substance inside the particles to exhibit excellent handling characteristics and to prevent the elution of iron ions without fail. Here, it is desirable that the thickness of the surface coating layer be greater than the maximum diameter of the superparamagnetic substance to be used. The thickness of the surface coating layer is usually more than 100 Å.

In the present invention, the following processes (1)–(3) may be used to prevent the superparamagnetic substance from flowing out of the magnetic polymer particles.

(1) A process comprising further polymerizing a vinyl monomer in the presence of the resulting magnetic polymer particles after the polymerization reaction.

(2) A process comprising bringing an iron solubilizer into contact with the resulting magnetic polymer particles, and dissolving and removing the superparamagnetic substance remaining around the surface of the magnetic polymer particles after the polymerization reaction.

(3) A process comprising bringing an organic base and/or a water soluble solvent into contact with the resulting magnetic polymer particles after the polymerization reaction.

Process (1)

This process includes polymerizing a vinyl monomer in the presence of the magnetic polymer particles. By this process, the elution of an iron-containing superparamagnetic substance can be reduced, reliability on properties required of the polymer particles containing a superparamagnetic substance can be improved, and a change in properties with time can be minimized.

The above-mentioned vinyl monomers are appropriately selected depending on the uses of the magnetic polymer particles. As the vinyl monomer, the vinyl monomers illustrated in the process for manufacturing the magnetic polymer particles are exemplified. Among these monomers, aromatic vinyl compounds, methacrylates, and unsaturated carboxylic acids are preferred.

Also, it is possible to have a great amount of non-magnetic polymer component present on the surface of the magnetic polymer particles by using monomers, for example, water soluble vinyl monomers which can be absorbed with difficulty by the polymers constituting the magnetic polymer particles, as the vinyl monomer.

There is no limitation to the process for polymerizing vinyl monomers in the presence of the magnetic polymer particles. Typical examples of such a process include a process (A) (called "monomer absorbing polymerization process") comprising absorbing the vinyl monomer by the magnetic polymer particles, after which polymerization is carried out; a process (B) (called "seed polymerization process") comprising using, as seeds, magnetic polymer particles dispersed in water and continuously and/or intermittently supplying the vinyl monomer to be polymerized; and a process (C) (called "capsule polymerization process") comprising forming an adsorbed layer on the surface of the reformed magnetic particles (1) and polymerizing the vinyl monomer in the adsorbed layer.

Among these processes (A) to (C), specifically the processes (A) and (B) are desirable for producing coating without fail even when magnetic polymer particles with a small particle diameter are used.

In the Process (C), the addition of vinyl monomers is desirable subsequent to substantial completion of polymerization of monomer mixture, i.e. after the polymerization conversion rate of 90% has been achieved.

The amount of vinyl monomer used for reforming the magnetic polymer particles is 10–1000 parts by weight, preferably 20–500 parts by weight, per 100 parts by weight of the magnetic polymer particles. When an excess amount of the vinyl monomer is used, non-magnetic particles can be produced. These particles, however, can be easily removed as required by a magnetic sedimentation treatment.

Process (2)

The iron solubilizer in the present invention is a compound which can dissolve iron components contained in the magnetic polymer particles and which cannot substantially dissolve the polymer components in the magnetic polymer particles.

The phrase "treating with the iron solubilizer" in the present invention may be understood as a treatment wherein the magnetic polymer particles are brought into contact with the iron solubilizer directly, or preferably in an aqueous medium.

With the magnetic polymer particles, the presence of the iron-containing superparamagnetic substance on and/or around the surface of the particles is not avoided. However, it is considered that the iron component remaining on and/or around the surface of the particles is primarily dissolved and removed by treating the magnetic polymer particles with the iron solubilizer. By this process, the elution of the iron-containing superparamagnetic substance can be avoided to the extent of exhibiting no problem in actual use and the capabilities required of the magnetic polymer particles can be improved, thereby effectively expanding the use.

In the present invention, a preferred process for treating the magnetic polymer particles with the iron solubilizer includes adding an aqueous solution of the iron solubilizer to an aqueous medium in which the magnetic polymer particles are dispersed.

Given as examples of the iron solubilizer used in the present invention are inorganic acids such as sulfuric acid, hydrochloric acid, and nitric acid; organic acids such as oxalic acid, citric acid, chloroacetic acid, mercaptoacetic acid, and sulfosalicylic acid; and, as complexing agents which form a complex with iron, thiocyanates such as potassium thiocyanate, sodium thiocyanate, and guanidine thiocyanate, mercapto compounds such as 2-mercaptoethanol, dithioglycerol, dithiotrimethylolpropane, and dithioerythritol, and nitrogen-containing complexing agents such as o-phenanthroline, 2,2'-bipyridyl, 8-quinolinol, and ethylenediamine.

Among these iron solubilizers, sulfuric acid is especially preferable as the inorganic acid because it can solubilize iron components at a high rate. When using these solubilizers such as sulfuric acid, it is desirable to adjust the concentration of acid and processing time for controlling the dissolved amount. Also, when hydrochloric acid or nitric acid is independently used as the iron solubilizer, considerable attention must be given to determine processing conditions, because sulfuric acid dissolves iron components at a too high rate and hydrochloric acid has oxidizing activities.

As the organic acid, mercaptoacetic acid and sulfosalicylic acid are especially preferable. However, since these organic acids can dissolve iron components at a low rate, it is desirable to provide a longer time for processing under heating.

As the complexing agent, potassium thiocyanate and guanidine thiocyanate are preferred among the thiocyanates, mercaptoethanol and dithioerythritol are preferred among the mercapto compounds, and o-phenanthroline and 2,2'-bipyridyl are preferred among the nitrous complexing agents.

A more excellent effect can be provided by using the above iron solubilizers in combinations of two or more. Specifically, the iron solubilizers are preferably used in combinations of two or more different types, for example, the organic acid and the thiocyanate, or the mercapto compound and the thiocyanate.

When the inorganic acid is used as the iron solubilizer, the dissolving rate of iron components is generally so high that the elution of the iron components not only from the surface and/or nearby the surface of the particles but also from the inside of the particles may not be avoided. Therefore, it is desirable to dissolve and to remove 5–60% by weight of an iron-containing superparamagnetic substance contained in the reformed magnetic particles. If the amount of the iron components to be removed is less than 5% by weight, a large amount of the iron-containing superparamagnetic substance remains on and/or around the surface of the reformed magnetic particles so that the elution of the iron-containing superparamagnetic substance is not negligible. Therefore, such reformed magnetic particles probably do not satisfy, for example, the actual performance required for biochemical applications. If the amount of the iron components to be removed exceeds 60% by weight, the content of the iron-containing superparamagnetic substance in the treated particles is insufficient, contributing to lowering of the rate of magnetic sedimentation and the like. Therefore, there are cases where the magnetic properties cannot be satisfied.

When the organic acid or the complexing agent is used as the iron solubilizer, iron components remaining on and/or around the surface of the reformed magnetic particles are selectively dissolved and removed. For this, the preferable amount of iron components to be dissolved and removed differs depending on the amount of iron-containing superparamagnetic substance remaining on and/or around the surface of the particles before treatment. Therefore, this amount to be removed cannot be unconditionally determined, but a sufficient effect can be provided by dissolving and removing, for example, about 1% by weight of the iron components when there is a small amount of the iron-containing superparamagnetic substance on and/or around the surface of the particles.

Preferable processing conditions using the iron solubilizer are determined so as to attain the object for which the amount of iron components to be dissolved is fixed as a goal. Though the preferable processing conditions depend on the sort of iron-containing superparamagnetic substance and inorganic acid, the treating temperature is in the range from 0° to 100° C., and the treating time is in the range from 0.5 to 2 hours in order to control the amount of iron components to be dissolved and removed. Illustrating the embodiments of preferable processing conditions when sulfuric acid is used, the concentration of sulfuric acid in an aqueous medium is 2 normal, the concentration of the magnetic polymer particles in an aqueous medium is 4 g/l, the treating temperature is 25° C., and the treating time is about 2 hours. It is desirable that the magnetic polymer particles treated by such inorganic acid be washed and then neutralized to pH 7 approximately by adding alkaline compounds to an aqueous medium in which the magnetic polymer particles are dispersed.

On the other hand, when the organic acid or the complexing agent is used, treating conditions may not be controlled so strictly as in the case where the inorganic acid is used, because the organic acid has high selectivity in dissolving iron components remaining on and/or around the surface of the magnetic polymer particles. Illustrating the embodiments of preferable processing conditions when using an iron solubilizer consisting of guanidine thiocyanate (1 mol) in an aqueous medium (1 l) and 2-mercaptoethanol (1% by weight), the treating temperature is 25° C. and the treating time is about 12 hours.

It is desirable that a small amount of the iron-containing superparamagnetic substance be present on and around the surface of the magnetic polymer particles treated by such iron solubilizer. This amount can be controlled according to the goal. This goal is the concentration of iron in an extract obtained by extracting, with a fixed amount of pure water, magnetic polymer particles sufficiently washed after the treatment with the iron solubilizer. In the present invention, the concentration of iron in the extract is less than 10 ppm, preferably less than 1 ppm, when the amount of pure water used for the extraction is 10 ml per 0.1 g of the magnetic polymer particles and the extraction is carried out at 70° C. for 2 hours.

Process (3)

In this process, the organic base is ammonia or organic amine compounds such as ethanolamine, diethanolamine, triethanolamine, dimethylamine, diethylamine, trimethylamine or the like.

In this process, inorganic fixed bases such as sodium hydroxide, potassium hydroxide and the like are only insufficiently penetrate the inside of the magnetic polymer particles. These inorganic bases are therefore ineffective in this process.

In this process, the water soluble solvent is organic solvents which are soluble in water and which have an affinity with the polymer. Given as specific examples of the water soluble solvent are acetone, mercaptoethanol, erythritol, dithioerythritol, ethyl acetate, butylcarbitol acetate, and phenylcellosolve.

Here, if the solubility of the organic solvent in water is less than 1% by weight at 25° C., the effect of this process cannot be exhibited.

This process is carried out by adding the organic base and/or the water soluble solvent to an aqueous solution in which the magnetic polymer particles are dispersed.

In this process, the amount by volume of the organic base and water soluble solvent are 0.1–20% and 1–95% respectively in the aqueous solution.

In this process, it is necessary that the pH of the aqueous solution in which the magnetic polymer particles are dispersed be more than 9, and more preferably more than 11.It is desirable on raise the treating temperature to 50°–80° C., though there is no restriction to the treating temperature. The treating time is usually 1–40 hours, though there is no limitation on the treating time. The concentration of the magnetic polymer particles is usually 1–20% by weight, though there is no limitation to the concentration of the magnetic polymer particles in the process. If the magnetic polymer particles precipitate out during the processing time, it is desirable that appropriate stirring be carried out.

With the treatment using the organic base and/or the water soluble solvent in this process, the surface charge of the magnetic polymer particles is greatly increased. Specifically, the surface charge is over 0.05 milli-equivalent/g. This value satisfies the practical performance required of the carboxyl group-modified particles.

The surface charge in this process can be determined by measuring an acid remaining on the surface of the magnetic polymer particles by conduct-metric titration. The surface charge is designated by milli-equivalent/g (milli equivalent number of carboxyl group remaining on the surface of particles per 1 g of magnetic polymer particles). Methods for measuring the surface charge are illustrated in, for example, J. Electroanal. Chem. Interfacial Electrochem, vol. 37, page 161 (1972).

A biologically activated material, such as antibodies, antigens, enzymes, coenzymes, or nucleic acid, can be combined with the magnetic polymer particles of the present invention. Particularly preferred biologically activated materials used in the field of diagnosis and research are avidin, streptoavidin, and single stranded DNA fragments. These biologically activated materials can be prepared by a usual culture method. A single stranded DNA fragment can be prepare by a common chemical synthetic method. It is desirable that the single stranded DNA fragment be a nucleotide consisting of 10–70 base pairs. A polyCpolyT fraction comprising cytosine and thymine is particularly preferred.

Either a chemical bonding method or a physical adsorption method can be used for immobilizing these biologically activated materials. For example, a biologically activated material can be combined with the magnetic polymer particles by causing a protein amino group in the biologically activated material to combine with the carboxyl group on the surface of magnetic polymer particles using a dehydration binder.

The magnetic polymer particles prepared in this invention can be used as carriers for diagnostics, carriers for bacterial isolation, carriers for cell segregation, carriers for isolation and purification of ribonucleic acids and proteins, carriers for immobilized enzymes, carriers for drug deliveries, and usable as material for magnetic toners, magnetic inks, and magnetic coatings.

Other features of the invention will become apparent in the course of the following description of exemplary embodiments which are given for illustration of the invention and are not intended to be limiting thereof.

EXAMPLES

In the examples below, "%" and "parts" mean "% by weight" and "parts by weight" respectively.

Example 1

Acetone was added to an oily superparamagnetic substance (Ferricolloid HC50™, manufactured by Taiho Industrial Co., Ltd.). After precipitation and drying, the surface of the substance was lipophilicated to prepare a ferritic superparamagnetic substance (0.01 $\mu$m). To 40 g of the ferritic superparamagnetic substance were added 75 g of cyclohexyl methacrylate, 20 g of methyl methacrylate, 5 g of methacrylic acid, and 3 g of benzoil peroxide as a polymerization initiator. The mixture was homogeneously dissolved to prepare an oily solution containing monomers. 10 g of polyvinyl alcohol, 0.05 g of sodium laurate, and 0.1 g of polyethylene oxide nonylphenyl ether were dissolved in 1000 g of water to prepare a water phase. The oily solution containing monomers as an organic phase was added to the water phase. The organic phase was premixed with the water phase using a homogenizer and then dispersed using an ultrasonic dispersing machine to prepare an oil-in-water type emulsion with the average diameter of the oil droplets being 2 $\mu$m.

This emulsion was placed in a three-neck flask (2 l) equipped with a stirrer, stirred in a nitrogen gas atmosphere, and then polymerized at 75° C. for 5 hours to obtain magnetic polymer particles at a polymerization yield of 98%. These particles could be readily precipitated with suction using a magnet (hereinafter this precipitation is called, "magnetic precipitation") and easily dispersed in water again. Using these characteristics of the particles, the particles were washed and refined by magnetically precipitating them three times in distilled water.

The resulting magnetic polymer particles were spherical with an average diameter of 1.8 $\mu$m and with the coefficient of variation being 35%.

The number average particle diameter of the magnetic polymer particles prepared in this manner was measured to evaluate the dispersibility and stationary stability of a superparamagnetic substance of the magnetic polymer particles. The methods for evaluation are illustrated below. The results are shown in Table 1.

<Number average diameter of magnetic polymer particles>

The magnetic polymer particles were placed on a collodion membrane for electron microscope observation and dyed using uranyl acetate, following which microphotographs of the magnetic polymer particles were taken using a transmission type electron microscope. The particle diameters of more than 500 particles randomly selected from the magnetic polymer particles were measured to determine the number average diameter.

<Evaluation of dispersibility of superparamagnetic substance>

The magnetic polymer particles were placed on a collodion membrane. The dispersion condition of a superparamagnetic substance of the magnetic polymer particles was observed using a transmission electron microscope at a magnification sufficient for one magnetic polymer particle to occupy ⅓ of the vision. The case where the superparamagnetic substance was uniformly dispersed through the inside of or the center of the magnetic polymer particles was rated as "good" and the case where the superparamagnetic substance remained locally near part or all of the surface of the magnetic polymer particles was rated as "bad".

<Evaluation of stationery stability>

The magnetic polymer particles were diluted to adjust the solid concentration ($c_0$) to 1%. The dilute solution was placed in a 20 ml sample bottle so that the height of the liquid phase was 2 cm, and the sample bottle was shaken until the magnetic polymer particles were uniformly dispersed. After the bottle was allowed to stand for 10 minutes, the upper layer of 1 cm from the level of the liquid was discharged from the bottle. The solid concentration ($c_0$) of the upper layer was measured. The value of ($c/c_0 \times 100$) was calculated as a standing stationary index (%).

Examples 2 and 3, Comparative Examples 1 and 2

The magnetic polymer particles in Examples 2, 3 and Comparative Examples 1, 2 were prepared in the same manner as in Example 1 except that the different monomers shown in Table 1 were used.

Fat Co., Ltd.) as an oil soluble polymerization initiator and this mixture was homogenized to prepare a monomer compound.

The monomer compound (organic phase) thus obtained was added to 1,000 parts of 1% aqueous solution of polyvinyl alcohol and emulsified and dispersed to prepare a suspension with a dispersed particle diameter of 0.1–1 $\mu$m). The suspension was transferred into a 2 l separable flask in which air was replaced with nitrogen. A monomer compound consisting of 20 parts of ethylene glycol dimethacrylate, 35 parts of methyl methacrylate, and 5 parts of methacrylic acid was added to the suspension and absorbed in the oil phase of the suspension. The mixture was heated to a temperature of 80° C. and suspension-polymerized in a nitrogen atmosphere for 6 hours while stirring at a rotating speed of 170 rpm to prepare a dispersoid (magnetic polymer latex) of the magnetic polymer particles of the present invention. The magnetic polymer latex thus obtained was a dispersoid in which the polymerization conversion rate was 99%, the content of a superparamagnetic substance in the magnetic polymer particles was 21%, and the solid concentration was 13%.

Examples 5–8

Monomer compounds (organic phase) of Examples 5–8 were prepared in the same manner as in Example 1 except that 40 parts of a superparamagnetic substance was added to the component A1 shown in Table 2. Each monomer compound thus obtained was added to 1,000 parts of 1% aqueous solution of polyvinyl alcohol and emulsified and dispersed to prepare a suspension. Dispersoids (magnetic polymer latex) of the magnetic polymer particles of the present invention were prepared by suspension-polymerizing in the same manner as in Example 4 except that the hydrophilic

TABLE 1

|  | Example | | | Comparative Example | |
|---|---|---|---|---|---|
|  | 1 | 2 | 3 | 1 | 2 |
| Monomer | | | | | |
| 2-Ethylhexyl methacrylate | — | — | 10 | — | 10 |
| Cyclohexyl methacrylate | 75 | — | 50 | — | 10 |
| Methyl methacrylate | 20 | — | — | — | 10 |
| Cyclohexyl acrylate | — | 75 | — | — | — |
| Methacrylic acid | 5 | 3 | 5 | 5 | 5 |
| Acrylic acid | — | 2 | — | — | — |
| Styrene | — | — | 35 | 95 | 75 |
| Superparamagnetic substance | | | | | |
| Ferrite | 40 | 40 | 40 | 40 | 40 |
| Evaluation | | | | | |
| Polymerization stability | Good | Good | Good | Bad | Bad |
| Polymerization conversion rate (%) | 98 | 99 | 98 | 97 | 89 |
| Proportion of superparamagnetic substance (%) | 28 | 27 | 28 | 20 | 26 |
|  | 12.5 | 12.4 | 12.5 | 12.5 | 12.9 |
| Solid components (%) | 1.8 | 1.2 | 1.5 | 1.2 | 1.3 |
| Number average particle diameter (mm) | Good | Good | Good | Bad | Bad |
| Dispersibility of Superparamagnetic substance | 92 | 95 | 94 | 54 | 48 |
| Stationary stability index (%) | | | | | |

Example 4

40 parts of a powdery superparamagnetic substance (particle diameter of 80–120 Å) consisting of lipophilicated iron oxide was added to 40 parts of 2-ethylhexyl acrylate and the mixture was stirred to disperse the superparamagnetic substance. To the mixture was added 2 parts of an organic peroxide (Perbutyl O™, manufactured by Nippon Oil and monomer shown in Table 2 was added to the above suspension. The polymerization stability, polymerization conversion rate, content of a superparamagnetic substance in the magnetic polymer particles, solid concentration, number average particle diameter of the magnetic polymer particles, and dispersibility and stationary stability of the superparamagnetic substance in the magnetic polymer particles of each magnetic polymer latex thus prepared measured. The results of the evaluation and measurement are shown in Table 2. The polymerization stability in Table 2 was evaluated by passing the product (dispersoid) through a 200 mesh stainless screen immediately after completion of polymerization and by measuring the residue remaining on the screen. The case where the amount of the residue was less than 10% by weight of all solids in the product was rated as "good" and the case where the amount of the residue was more than 10% by weight was rated as "bad".

TABLE 2

| Example | 5 | 6 | 7 | 8 |
|---|---|---|---|---|
| Suspension | | | | |
| Monomers (Organic phase) | | | | |
| Superparamagnetic substance (iron oxide powder) | 40 | 40 | 40 | 40 |
| Hydrophobic monomer | | | | |
| 2-Ethylhexyl acrylate (A1) | 40 | 40 | | |
| Lauryl methacrylate (A1) | | | 40 | |
| Vinyl laurate (A1) | | | | 40 |
| Organic peroxide (Polymerization initiator) | | | | |
| Perbutyl O ™ | 2 | 2 | 2 | 2 |
| Water phase | | | | |
| Polyvinyl alcohol (emulsifier) | 10 | 10 | 10 | 10 |
| Ion-exchange water | 990 | 990 | 990 | 990 |
| Monomers added to the suspension (Hydrophilic monomer) | | | | |
| Ethylene glycol dimethacrylate (A2) | 20 | 20 | 20 | 20 |
| Methyl methacrylate (A2) | 35 | | | 20 |
| Dimethylaminoethyl acrylate (A2) | | 38 | | |
| Vinyl acetate (A2) | | | 35 | |
| Methacrylic acid (B) | 5 | | 4 | 20 |
| Acrylonitril (C) | | 2 | 1 | |
| Evaluation of magnetic polymer latex | | | | |
| Polymerization stability | Good | Good | Good | Good |
| Polymerization conversion rate (%) | 99 | 92 | 95 | 99 |
| Content of a superparamagnetic substance (%) | 21 | 22 | 24 | 23 |
| Solid component concentration (%) | 13 | 13 | 13 | 13 |
| Number average particle diameter the magnetic polymer particles (mm) | 0.2 | 0.2 | 0.3 | 0.2 |
| Dispersibility of superparamagnetic substance | Good | Good | Good | Good |
| Stationary stability index (%) | 97 | 96 | 92 | 96 |

Comparative Example 3

A comparative dispersoid (magnetic polymer latex) of the magnetic polymer particles was prepared by preparing a monomer compound and a suspension, and by suspension-polymerizing the monomer compound in the same manner as in Example 1, except that 40 parts of a superparamagnetic substance was added to a mixed monomer compound consisting of 5 parts of methacrylic acid (ethylenically unsaturated carboxylic acid (B)) and 95 parts of stylene (vinyl monomer(C)) according to the formulation shown in Table 2 and dispersed.

Comparative Example 4

A comparative dispersoid (magnetic polymer latex) of the magnetic polymer particles was prepared by preparing a monomer compound and a suspension, and suspension-polymerizing the monomer compound in the same manner as in Example 1 except that 40 parts of a superparamagnetic substance was added to a mixed monomer compound consisting of 10 parts of 2-ethylhexyl acrylate "component A1", 10 parts of methyl methacrylate "component A2", 5 parts of methacrylic acid (ethylenically unsaturated carboxylic acid (B)), and 75 parts of stylene (vinyl monomer(C)), according to the formulation shown in Table 2, and dispersed.

The polymerization stability, polymerization conversion rate, content of a superparamagnetic substance in the magnetic polymer particles, solid concentration, number average particle diameter of the magnetic polymer particles, and the dispersibility and stationary stability of the superparamagnetic substance in the magnetic polymer particles for each comparative magnetic polymer latex thus prepared were measured. The results of the evaluation and measurement are shown in Table 3.

Comparative Example 5

Micro particles of magnetite (Magnetite EPT500, manufactured by Toda Industrial Co., Ltd.) were lipophilicated with sodium oleate to prepare a ferromagnetic substance. A comparative dispersoid (magnetic polymer latex) of the magnetic polymer particles was provided by preparing a monomer compound and a suspension, and suspension-polymerizing the monomer compound in the same manner as in Example 1 except that the ferromagnetic substance instead of the superparamagnetic substance was used. The polymerization stability, polymerization conversion rate, content of a superparamagnetic substance in the magnetic polymer particles, solid concentration, number average particle diameter of the magnetic polymer particles, and dispersibility and stationary stability of the superparamagnetic substance in the magnetic polymer particles for the comparative magnetic polymer latex thus prepared were measured. The results of the evaluation and measurement are shown in Table 3.

TABLE 3

| Comparative Example | 3 | 4 | 5 |
|---|---|---|---|
| Suspension | | | |
| Monomers (Organic phase) | | | |
| Superparamagnetic substance (iron oxide powder) | 40 | 40 | |
| Supermagnetic substance (Magnetite) | | | 40 |
| 2-Ethylhexyl acrylate (A1) | | 10 | 40 |
| Methyl methacrylate (A1) | | 10 | |
| Methacylic acid (B) | 5 | 5 | |
| Styrene (C) | 95 | 75 | |
| Organic peroxide (Polymerization initiator) | | | |
| Perbutyl O ™ | 2 | 2 | 2 |
| Water phase | | | |
| Polyvinyl alcohol (emulsifier) | 10 | 10 | 10 |
| Ion-exchange water (dispersant) | 990 | 990 | 990 |
| Monomers added to the suspension (Hydrophilic monomer) | | | |
| Ethylene glycol dimethacrylate (A2) | | | 20 |
| Methyl methacrylate (A2) | | | 35 |
| Methacrylic acid (B) | | | 5 |
| Evaluation of magnetic polymer latex | | | |
| Polymerization stability | Good | Good | Good |
| Polymerization conversion rate (%) | 89 | 91 | 99 |
| Content of a superparamagnetic substance (%) | 26 | 25 | 28 |
| Solid component concentration (%) | 13 | 13 | 12 |
| Number average particle diameter the magnetic polymer particles (mm) | 0.2 | 0.2 | 13 |
| Dispersibility of superparamagnetic substance | Bad | Bad | Bad |
| Stationary stability index (%) | 96 | 92 | 10 |

Example 8

A dispersoid (magnetic polymer latex) of the magnetic polymer particles of the present invention was prepared in the same manner as in Example 1 except that 19 parts of methyl methacrylate and 1 part of methacrylic acid were added to the reaction mixture 3 hours after the suspension polymerization was started and the suspension polymerization was continued for 5 hours. The polymerization conversion rate of the magnetic polymer latex thus prepared was 95% and a surface coating layer excluding a superparamagnetic substance was formed on the magnetic polymer particles constituting the magnetic polymer latex in this Example.

Example 9

100 parts of the magnetic polymer latex prepared in Example 1 was added to 1,000 parts of 0.1N hydrochloric acid to elute and remove a superparamagnetic substance remaining around the surface of the magnetic polymer particles from the magnetic polymer particles. The magnetic polymer particles were refined by washing by magnetically separation to prepare a dispersoid (magnetic polymer latex) of the magnetic polymer particles of the present invention. A surface coating layer excluding a superparamagnetic substance was formed on the magnetic polymer particles constituting the magnetic polymer latex in this Example.

Example 10

250 ml of 2N sulfuric acid was added to 10 g (solid content: 1 g) of the magnetic polymer latex and the mixed solution was moderately stirred at 25øC. for 3 hours to carry out acidic treatment. Immediately after the acidic treatment was finished, the magnetic precipitation was carried out to separate the magnetic polymer particles from the solution. The separated magnetic polymer particles were washed twice with 200 ml of an aqueous solution containing 0.01% by weight of polyoxyethylene nonylphenyl ether (Emulgen 910# manufactured by Kao Corporation). The magnetic polymer particles were dispersed in 10 ml of distilled water and the pH of the mixed solution was adjusted to 7 by the addition of sodium hydroxide with a concentration of 0.5% by weight to obtain a dispersed solution containing 0.75 g of reformed magnetic polymer particles.

In the reformed polymer particles, the content of a ferrite which was measured by a method using a thermobalance was 26.4% by weight and 20% by weight of the ferrite contained in the magnetic polymer particles was dissolved and removed. The average particle diameter of the reformed magnetic particles was 1.2 μm and the particle diameters were distributed in the range from 0.1 to 5 μm. There was no large difference in these properties before and after and before the acidic treatment.

In addition, the dispersed solution containing reformed magnetic polymer particles and the dispersed solution containing magnetic polymer particles prepared in Example 2 (solid content of both solutions: 0.1 g) were magnetically precipitated twice by adding ion exchange water to recover the magnetic polymer particles. The magnetic polymer particles were then thoroughly washed with water. The washed magnetic polymer particles were stirred at 70° C. for 24 hours in 10 ml of ion exchange water and the supernatant liquid was subjected to atomic absorption analysis to measure iron concentration. As a result, 73 ppm of iron was detected from the magnetic polymer particles prepared in Example 2. In contrast, only 1 ppm of iron was detected from the reformed magnetic polymer particles.

Example 11

1 g of ammonia water with a content of 1% by weight was added to 10 g (solid content: 1 g) of the magnetic polymer latex prepared in Example 1. After adjusting the pH of the suspension to 12.5, the vessel containing the suspension was sealed, and the vessel was slowly shaken at 60° C. for 10 hours to perform reforming treatment. After the resulting suspension was cooled, the suspension was neutralized by the addition of 0.5N sulfuric acid to adjust the pH of the suspension to 7. The resulting magnetic polymer particles were washed with water and dispersed four times to obtain reformed magnetic polymer particles as a result of the process using ammonia.

There was no difference in the content of a superparamagnetic substance, particle diameter, and distribution of particle diameter between the reformed magnetic polymer particles prepared in this Example and the base magnetic polymer particles prepared in Example 1. However, the surface charge of the reformed magnetic polymer particles was greatly increased to 0.125 milli-equivalent/g.

Examples 12–23

Magnetic polymer particles were prepared in the same manner as in Example 11 except that the base magnetic particles and treating agents shown in Table 4 were used.

In these treatments, when only a water soluble solvent was used without an organic base, the pH of the solution was adjusted to 12 by the addition of 0.5N sodium hydroxide.

TABLE 4

| Example | Base magnetic particles | Organic base and water soluble solvent | Surface charge * |
|---|---|---|---|
| 12 | 1 | 1 wt. % aqueous ammonia (1 g) | 0.125 |
| 13 | 1 | 1 wt. % aqueous ammonia (1 g)/ acetone (1 g) | 0.151 |
| 14 | 1 | 5 wt. % aqueous solution of diethanolamine (1 g) | 0.091 |
| 15 | 1 | 5 wt. % aqueous solution of diethanolamine (1 g) β-Mercaptoethanol (1 g) | 0.125 |
| 16 | 1 | 5 wt. % aqueous solution of ethanolamine (1 g) | 0.082 |
| 17 | 1 | 5 wt. % aqueous solution of ethanolamine (1 g) Dithioerythrithol (1 g) | 0.135 |
| 18 | 1 | Ethyl acetate (1 g) | 0.072 |
| 19 | 1 | Acetone (1 g) | 0.055 |
| 20 | 1 | β-Mercaptoethanol (1 g) | 0.061 |
| 21 | 1 | Dithioerythrithol (1 g) | 0.072 |
| 22 | 2 | 1 wt. % aqueous ammonia (1 g)/ acetone (1 g) | 0.021 |
| 23 | 3 | 1 wt. % aqueous ammonia (1 g)/ acetone (1 g) | 0.110 |

* milli-eauivalent/g

Experimental Example 1

The magnetic polymer latexes prepared in Examples 1–4, 8, 9, 11, 14, and 19 and Comparative Examples 3, 4, and 5 were evaluated as carrier particles for immuno-diagnostics (carriers used in enzyme immuno-assay) by the following experiments.

Each magnetic polymer latex prepared in the Examples and Comparative Examples was sampled in the amount of 10 mg converted to the solid content. Magnetic polymer particles were magnetically separated from the sampled magnetic latex and the separated magnetic polymer particles were dispersed in 1 ml of phosphate buffered saline solution (pH 7.5). To the suspension was then added 200 μg of anti-human IgM antibody. The resulting suspension was slowly shaken to adsorb the above antibody on the surface of particles. By this process, the magnetic polymer particles were sensitized. Additionally, the sensitized magnetic polymer particles were magnetically separated from the supernatant liquid and the absorbance of the supernatant liquid at 280 nm was measured to confirm whether the antibody remained in the supernatant or not. As a result, no anti-body was found to remain in any supernatant liquid. Therefore, it was confirmed that the added anti-body was fully absorbed on the magnetic polymer particles.

1 ml of phosphate buffered saline solution (pH 7.5) containing 0.5% of bovine serum albumin and 0.1% of polyethylene glycol was added to each group of magnetic polymer particles (particles sensitized by anti-human IgM anti-body) which were magnetically separated. After the mixture was vibrated with a vibrator for dispersion, it was slowly shaken at room temperature for 30 minutes for the surface of the particles on which no anti-body was adsorbed to be blocked with the albumin. By this process, particles of diagnostics used for enzyme immunoassay (EIA method) were prepared.

Using each group of particles of diagnostics thus obtained, the following operations were carried out. Plural phosphate buffered saline solutions were each prepared in the amount of 100 µl including a human IgM antigen with a concentration of 0 ng/ml, 50 ng/ml, 100 ng/ml, or 500 ng/ml. 20 µl of a suspension containing the diagnostics particles was added to each phosphate buffered saline prepared in this manner and the mixture was allowed to stand at room temperature for 30 minutes. To the mixture was then added 200 µl of a solution containing 100 µg of anti-human IgM anti-body which was made by combining acetylcholinesterase with magnetic polymer particles which was magnetically separated. After the resulting mixture was vibrated with a vibrator for dispersion, it was allowed to stand at 25° C. for one hour.

Next, to the resulting mixture was added 100 µl of Ellman's reagent (manufactured by Cayman Co., Ltd.) which was a substrate of acetylcholinesterase and the mixture was slowly shaken at room temperature for 10 minutes to carry out an enzymatic reaction until color was developed. After adding 50 µl of 2N sulfuric acid as a reaction stop solution, the absorbance of the reaction mixture at 412 nm was measured. While, as a comparative experiment, 20 µl of a suspension containing non-sensitized particles was added to phosphate buffered saline solution excluding a human IgM antigen and the mixture was processed in the same manner as above to prepare a reaction mixture. The absorbance of the resulting reaction mixture was measured. These results are shown in Table 5.

TABLE 5

|  | Sensitized particles | | | | Unsensitized particles |
|---|---|---|---|---|---|
|  | Amount of Human IgM Antigen added (ng/ml) | | | | |
|  | 0 | 50 | 100 | 500 | 0 |
| Example 1 | 0.005 | 0.080 | 0.124 | 0.583 | 0.005 |
| Example 2 | 0.006 | 0.079 | 0.123 | 0.521 | 0.004 |
| Example 3 | 0.004 | 0.086 | 0.145 | 0.601 | 0.003 |
| Example 4 | 0.006 | 0.069 | 0.156 | 0.574 | 0.007 |
| Example 8 | 0.003 | 0.075 | 0.122 | 0.553 | 0.002 |
| Example 9 | 0.002 | 0.072 | 0.119 | 0.544 | 0.001 |
| Example 11 | 0.003 | 0.087 | 0.139 | 0.662 | 0.002 |
| Example 14 | 0.002 | 0.095 | 0.145 | 0.710 | 0.003 |
| Example 19 | 0.002 | 0.079 | 0.131 | 0.590 | 0.001 |
| Comparative Example 3 | 0.401 | 0.486 | 0.521 | 0.721 | 0.421 |
| Comparative Example 4 | 0.289 | 0.323 | 0.388 | 0.689 | 0.299 |
| Comparative | 0.486 | 0.532 | 0.599 | 0.768 | 0.475 |

TABLE 5-continued

|  | Sensitized particles | | | | Unsensitized particles |
|---|---|---|---|---|---|
|  | Amount of Human IgM Antigen added (ng/ml) | | | | |
|  | 0 | 50 | 100 | 500 | 0 |
| Example 5 |  |  |  |  |  |

K 562 cells which were cancer cells of human leucocyte were cultured on a PRM 1-1640 medium containing 1% by weight of fetal bovine serum. When the number of cells in the cultured suspension was $5 \times 10^5$/ml, 1 ml of the cultured suspension was sampled in a sampling tube and centrifuged at a rotation of 500 rpm for 5 minutes to recover the cultured cells. To the recovered cells was added 1 ml of potassium phosphate buffer solution (pH 7.2) and the mixed solution was converted to a cell-free solution by ultrasonic treatment.

The cell-free solution wherein the K 562 cells were dissolved was sampled in the amount of 0.5 ml in each of three tubes (capacity 2 ml) for centrifugation and each of the cell-free solution was diluted with a 10 mM phosphate buffer solution to bring the total volume to 2 ml. To three tubes for centrifugation were added respectively 0 molecule, 10 molecules, and 50 molecules of HIV-1DNA sampled from human leukocyte (NY 10 strains) cultured for the integration of the DNA of the AIDS virus. After vortexing, into each of the tubes for centrifugation was charged 2 µl of the suspensoid (solid concentration: 10% by weight) comprising dispersed cationic magnetic polymer particles prepared in Example 6. The mixture was stirred at a rotating speed of 10 rpm at room temperature for 5 minutes. The magnetic polymer particles were then magnetically separated and 25 µl of PCR reaction solution shown in Table 6 below was added to each of the magnetic polymer particles to carry out PCR reaction.

TABLE 6

| Composition of PCR reaction solution | |
|---|---|
| 10 × Reaction buffer manufactured by Takara Co. | 2.5 µl |
| dNTP mix (1 mM) manufactured by Takara Co. | 5.0 µl |
| Primer SK 145A (20 mM) | 0.5 µl |
| Primer SK 451A (20 mM) | 0.5 µl |
| Tag DNA Polymerase (0.5 UNIT/ml) manufactured by Takara Co. | 1.25 µl |
| Sterilized distilled water | 5.25 µl |
| Mineral oil manufactured by Sigma Co. | 5.25 µl |

In Table 6, the sequences of Primer SK 145A™ and Primer SK 415A™ are respectively (5'CCCACAAGATTTAAACACCA 3') and (5'TGAAGGGTACTAGTAGTTCC 3'). These compounds were synthesized according to the maker manual using a DNA synthesizer (type 381A, manufactured by Apride BIO System Co., Ltd). The synthesized product was subjected to HPLC (high performance liquid chromatography) to obtain an refined product.

Specifically as the PCR reaction, the amplified reaction was carried out using Thermal Cycler, model JP 2000™ (manufactured by PERKIN ELMER CETUS Co., Ltd.) according to the temperature program of (94° C.×0.5 minute, 55° C.×1.0 minute, 72° C.×1.5 minutes) repeated 30 times and 72° C.×7 minutes.

The product obtained by the amplified reaction in the first PCR process was sampled in the amount of 5 µl. According to the Nested PCR process, the sampled product was reacted in the same manner as in the above PCR process except that Primer SK 145™ (manufactured by Takara Co., Ltd.) and Primer SK 451A™ (manufactured by Takara Co., Ltd.) were used instead of Primer SK 145A™ and Primer 451A™ respectively to prepare the product.

Each of the products prepared by the amplified reaction in both the PCR process and Nested PCR process was caused to migrate by a Mupid type electrophoretic apparatus in TBE buffer solution (buffer solution consisting of 50 mM boric acid, pH: 8.2) using 2% by weight of Agarose 1600 (trade mark, manufactured by Wako Pure Chemical Industries, Ltd.) and detected under radiation of UV light with a wave length of 254 nm after dyeing with ethyzium bromide. These results are shown in Table 7

TABLE 7

| Number of HIV-1DNA molecule | 0 | 10 | 50 |
|---|---|---|---|
| Results of the PCR | — | + | + |
| Results of the Nested PCR | — | + | + |

As shown by the results in Table 5, it was confirmed that the magnetic polymer particles of the present invention could be utilized in the PCR process, because DNA could be recovered by magnetically separation instead of centrifugation using the magnetic polymer particles of the present invention.

A novel magnetic polymer particles comprising a superparamagnetic substance capable of exhibiting excellently homogeneous dispersibility is provided by the present invention.

The magnetic polymer particles of the present invention have high magnetic responsibility. Also, since there is no problem of elution of iron ions into an aqueous medium from the magnetic polymer particles included in a dispersoid (magnetic polymer latex) of the polymer particles of the present invention, the magnetic polymer latex can be suitably used for various applications and in various fields in which the use of conventional polymer latexes is limited because of the above-mentioned problems. Also, the magnetic polymer particles resist precipitation in the aqueous medium so that they can exist in the medium in a condition to be uniformly dispersed.

Furthermore, a novel polymer particles on which surface coating is formed can be provided. A dispersoid (magnetic polymer latex) of the magnetic polymer particles can certainly protect iron ions from eluting from the magnetic polymer particles into an aqueous medium.

Still further, the magnetic polymer particles having the above excellent characteristics and their dispersoid can be certainly prepared.

The magnetic polymer particles of the present invention can be widely used for various applications and in various fields requiring magnetic responsibility because they have the above excellent characteristics. Therefore, the magnetic polymer particles of the present invention can be widely used as diagnostics by physically and chemically adsorbing, for example, an antigen, anti-body, protein, and nucleic acid. Also, when the magnetic polymer particles are used as diagnostics for enzyme immunoassay, the practicality and reliability of the diagnostics can be promoted because non-specific coloring caused by the elution of iron ions from the magnetic polymer particles can be restrained. Also, since there is no case where a superparamagnetic substance is exposed on the surface of the magnetic polymer particles, the magnetic polymer particles of the present invention have excellent electrostatic properties and capabilities of forming film so that they are useful as material for magnetic toners, magnetic inks, and magnetic coatings.

Obviously, numerous modifications and variations of the present invention are possible in light of the above teachings. It is therefore to be understood that, within the scope of the appended claims, the invention may be practiced otherwise than as specifically described herein.

What is claimed is:

1. Magnetic polymer particles with a particle diameter of 0.5–30 μm, which comprises:

100 parts by weight of a copolymer which is composed of (A) 30–99% by weight of alkyl (meth)acrylate monomer unit having an alkyl group containing 4–20 carbon atoms, (B) 1–20% by weight of a monomer unit containing unsaturated carboxylic acid, and (C) 0–69% by weight of vinyl monomer unit which is copolymerizable with the monomers (A) and (B), and 3–100 parts by weight of a superparamagnetic substance.

2. The magnetic polymer particles according to claim 1, wherein the alkyl (meth)acrylate monomer unit (A) having an alkyl group containing 4–20 carbon atoms is selected from the group consisting of 2-ethylcyclohexyl acrylate, 2-ethylcyclohexyl methacrylate, cyclohexyl acrylate, and cyclohexyl methacrylate.

3. The magnetic polymer particles according to claim 1, wherein the vinyl monomer unit (C) which is copolymerizable with the monomer units (A) and (B) is selected from the group consisting of alkyl (meth)acrylates having an alkyl group containing 1–3 carbon atoms and polyfunctional vinyl compounds.

4. The magnetic polymer particles according to claim 1, wherein said copolymer is comprised of (A) 50–85% by weight of cyclohexyl methacrylate monomer unit, (B) 1–10% by weight of a monomer unit containing unsaturated carboxylic acid, and (C) 0–45% by weight of an alkyl (meth)acrylate monomer unit having an alkyl group containing 1–3 carbon atoms.

5. The magnetic polymer particles according to claim 1, wherein said copolymer is comprised of (A) 30–50% by weight of 2-ethylcyclohexyl methacrylate monomer unit, (B) 1–10% by weight of a monomer unit containing unsaturated carboxylic acid, and (C) 20–40% by weight of an alkyl (meth)acrylate monomer unit having an alkyl group containing 1–3 carbon atoms and a polyfunctional vinyl compound monomer unit.

6. The magnetic polymer particles according to claim 1, wherein the superparamagnetic substance is an iron compound.

7. The magnetic polymer particles according to claim 1, wherein there is almost no superparamagnetic substance present close to the surface of the magnetic polymer particles.

8. The magnetic polymer particles according to claim 1, wherein the magnetic polymer particles have a biologically activated material chemically or physically combined therewith.

9. The magnetic polymer particles according to claim 8, wherein the biologically activated material is avidin or streptoavidin.

10. The magnetic polymer particles according to claim 8, wherein the biologically activated material is a single stranded DNA fragment having 10–70 base pairs.

* * * * *